US012688672B2

(12) United States Patent
Hirakawa

(10) Patent No.: US 12,688,672 B2
(45) Date of Patent: Jul. 21, 2026

(54) INFORMATION PROCESSING APPARATUS, INFORMATION PROCESSING METHOD, AND PROGRAM

(71) Applicant: NEC Corporation, Tokyo (JP)

(72) Inventor: Yasufumi Hirakawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 411 days.

(21) Appl. No.: 18/267,542

(22) PCT Filed: Jan. 19, 2022

(86) PCT No.: PCT/JP2022/001836
§ 371 (c)(1),
(2) Date: Jun. 15, 2023

(87) PCT Pub. No.: WO2022/201793
PCT Pub. Date: Sep. 29, 2022

(65) Prior Publication Data
US 2024/0054759 A1 Feb. 15, 2024

(30) Foreign Application Priority Data

Mar. 23, 2021 (JP) ................................. 2021-048118

(51) Int. Cl.
*G06T 7/62* (2017.01)
*G06T 7/20* (2017.01)
(Continued)

(52) U.S. Cl.
CPC .............. *G06V 10/761* (2022.01); *G06T 7/20* (2013.01); *G06T 7/62* (2017.01); *G06T 7/70* (2017.01);
(Continued)

(58) Field of Classification Search
CPC ........ G06V 10/761; G06V 20/53; G06T 7/62; G06T 7/70; G06T 7/20; G06T 2207/30242
See application file for complete search history.

(56) References Cited

U.S. PATENT DOCUMENTS 8,195,598 B2 6/2012 Hua et al.
11,545,024 B1 * 1/2023 Oostergo ......... G06Q 10/06314
(Continued)

FOREIGN PATENT DOCUMENTS

CN 107203760 A * 9/2017 ........... G06Q 50/265
CN 111008545 A * 4/2020 ............. G06V 20/53
(Continued)

OTHER PUBLICATIONS

JP Office Action for JP Application No. 2023-508685, mailed on Aug. 13, 2024 with English Translation.
(Continued)

*Primary Examiner* — Ross Varndell
*Assistant Examiner* — Nhut Huy Pham
(74) *Attorney, Agent, or Firm* — Sughrue Mion, PLLC

(57) ABSTRACT

An information processing apparatus includes at least one memory storing instructions, and at least one processor. The at least one processor is configured to execute the instructions to acquire image data of a predetermined space captured by a camera, generate measurement data including a person-to-person distance between persons included in the image data, set space data about a size of the space, determine whether a state of density of the persons in the space is appropriate or not, based on the measurement data and the space data, and output a determination result.

10 Claims, 14 Drawing Sheets

(51) Int. Cl.
    *G06T 7/70*       (2017.01)
    *G06V 10/74*     (2022.01)
    *G06V 20/52*     (2022.01)

(52) U.S. Cl.
    CPC .... *G06V 20/53* (2022.01); *G06T 2207/30242*
                        (2013.01)

(56)           References Cited

U.S. PATENT DOCUMENTS

| | | | |
|---|---|---|---|
| 2010/0322516 A1 | 12/2010 | Xu et al. | |
| 2016/0223503 A1* | 8/2016 | Abehassera | G01N 33/004 |
| 2017/0351924 A1* | 12/2017 | Hotta | H04N 7/18 |
| 2022/0036258 A1* | 2/2022 | Leach | G06Q 30/08 |

FOREIGN PATENT DOCUMENTS

| | | | | |
|---|---|---|---|---|
| CN | 111582052 A | * | 8/2020 | G06V 20/53 |
| JP | H06-295395 A | | 10/1994 | |
| JP | H08-256999 A | | 10/1996 | |
| JP | 2005-327134 A | | 11/2005 | |
| JP | 2007-201556 A | | 8/2007 | |
| JP | 2008-174076 A | | 7/2008 | |
| JP | 2009-181307 A | | 8/2009 | |
| JP | 2009-222321 A | | 10/2009 | |
| JP | 2013-137601 A | | 7/2013 | |
| JP | 2019-080341 A | | 5/2019 | |
| JP | 6764214 B | | 9/2020 | |
| WO | 2007/097210 A1 | | 8/2007 | |

OTHER PUBLICATIONS

International Search Report for PCT Application No. PCT/JP2022/001836, mailed on Mar. 8, 2022.
Japanese Office Communication for JP Application No. 2023-508685 mailed on Dec. 24, 2024 with English Translation.
AR Office Action for Argentine Patent Application No. 20220100582, mailed on Feb. 19, 2026 with English Translation.

\* cited by examiner

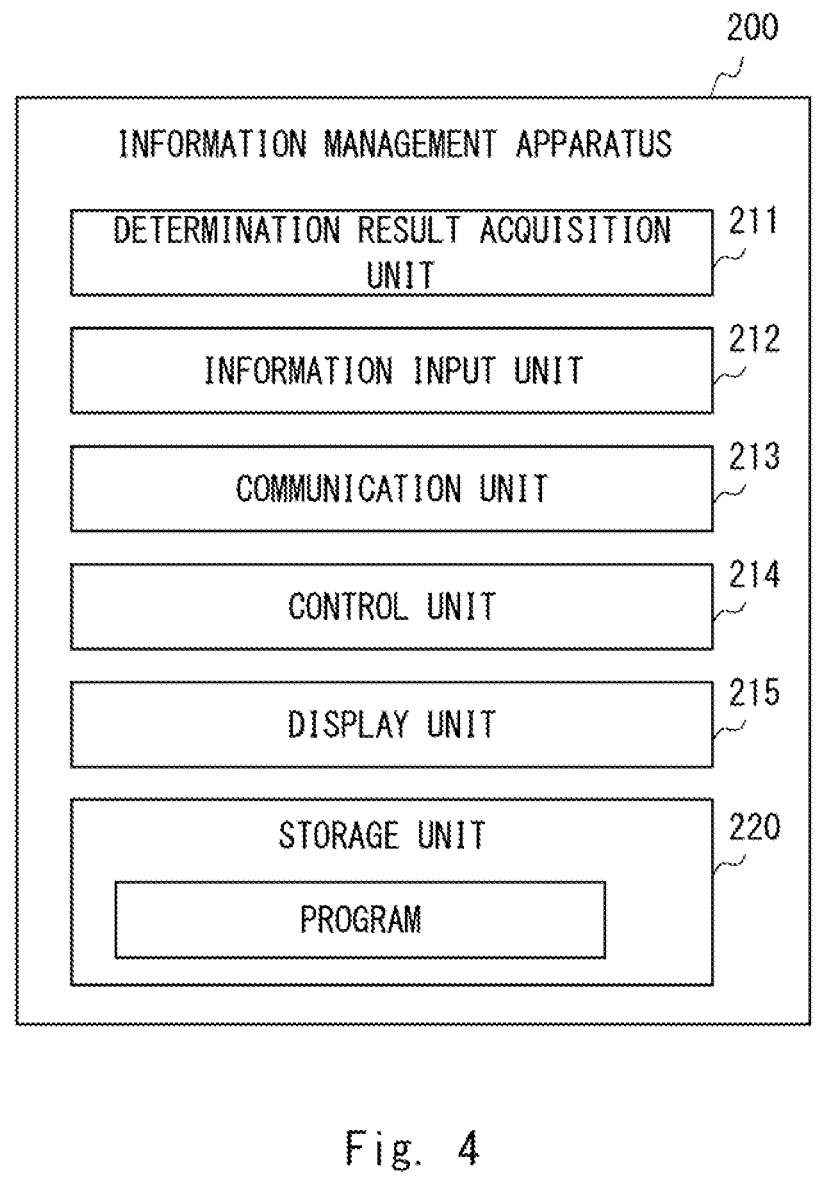

200

INFORMATION MANAGEMENT APPARATUS

DETERMINATION RESULT ACQUISITION UNIT — 211

INFORMATION INPUT UNIT — 212

COMMUNICATION UNIT — 213

CONTROL UNIT — 214

DISPLAY UNIT — 215

STORAGE UNIT — 220

PROGRAM

Fig. 4

INFORMATION PROCESSING APPARATUS, INFORMATION PROCESSING METHOD, AND PROGRAM

This application is a National Stage Entry of PCT/JP2022/001836 filed on Jan. 19, 2022, which claims priority from Japanese Patent Application 2021-048118 filed on Mar. 23, 2021, the contents of all of which are incorporated herein by reference, in their entirety.

TECHNICAL FIELD

The present disclosure relates to an information processing apparatus, an information processing method, and a program.

BACKGROUND ART

There is a demand for a technology for grasping a state of density of people in a predetermined space, and for controlling an infection risk in the space.

For example, Patent Literature 1 discloses a congestion information notification system including an image processing unit and an information transmission unit. The image processing unit displays an annular line indicating an outer edge of a circular area that is within a predetermined distance of a corresponding person in a monitoring target area, based on an actual distance, while superimposing the annular line on a privacy-protected image, the annular line being moved according to movement of the corresponding person. Furthermore, the information transmission unit transmits, as congestion information, the privacy-protected image where the annular line is displayed in a superimposed manner.

CITATION LIST

Patent Literature

Japanese Patent No. 6764214

SUMMARY OF INVENTION

Technical Problem

Knowing that a predetermined distance according to the technology mentioned above is secured may be used as one index for grasping the state of density. However, whether the state of density of people in a predetermined space is appropriate or not is not known.

The present disclosure has been achieved in view of such a problem and an object thereof is to provide an information processing apparatus and the like for properly determining whether a state of density in a space is appropriate or not.

Solution to Problem

An information processing apparatus according to an example embodiment of the present disclosure includes an image data acquisition unit, a measuring unit, a space data setting unit, a determination unit, and an output unit. The image data acquisition unit acquires image data of a predetermined space captured by a camera. The measuring unit generates measurement data including a person-to-person distance between persons included in the image data. The space data setting unit sets space data about a size of the space. The determination unit determines whether a state of density of the persons in the space is appropriate or not, based on the measurement data and the space data. The output unit outputs information about a determination result from the determination unit.

An information processing method according to an example embodiment of the present disclosure causes a computer to perform the following. The computer acquires image data of a predetermined space captured by a camera. The computer generates measurement data including a person-to-person distance between persons included in the image data. The computer sets space data about a size of the space. The computer determines whether a state of density of the persons in the space is appropriate or not, based on the measurement data and the space data. The computer outputs information about a result of the determination.

A program according to an example embodiment of the present disclosure causes a computer to perform the following steps. The computer acquires image data of a predetermined space captured by a camera. The computer generates measurement data including a person-to-person distance between persons included in the image data. The computer sets space data about a size of the space. The computer determines whether a state of density of the persons in the space is appropriate or not, based on the measurement data and the space data. The computer outputs information about a result of the determination.

Advantageous Effects of Invention

According to the above-described aspects, it is possible to provide an information processing apparatus and the like for properly determining whether a state of density in a space is appropriate or not.

BRIEF DESCRIPTION OF DRAWINGS

FIG. 4 is a block diagram of an information management apparatus according to the second example embodiment;

EXAMPLE EMBODIMENT

Figure 1:
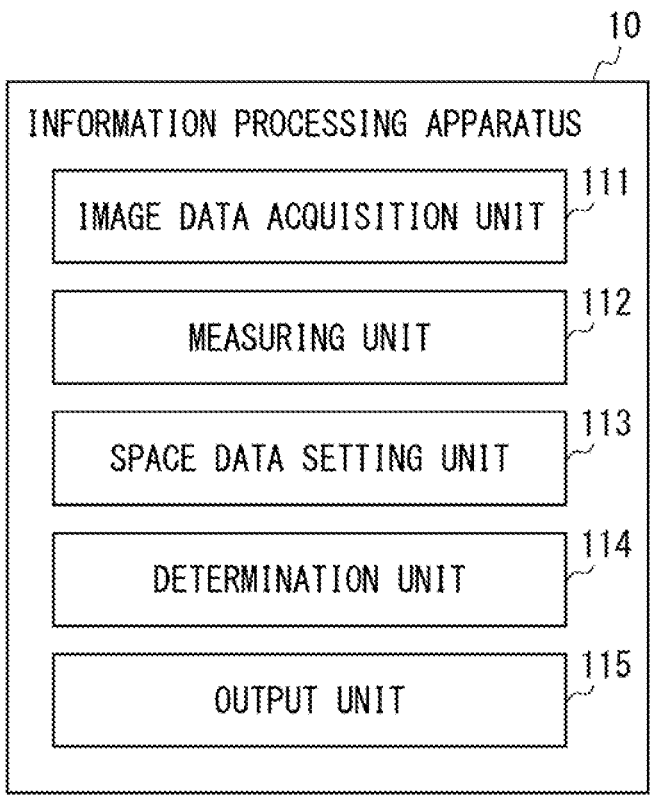
FIG. 1 is a block diagram of an information processing apparatus according to a first example embodiment.

Hereinafter, the present disclosure will be described through example embodiments of the disclosure; however, the disclosure pertaining to the claims is not limited to the following example embodiments. Furthermore, not all the configurations described in the example embodiments are essential as means for solving problems. The following description and drawings are omitted or simplified as appropriate for the sake of simplicity. Additionally, same elements in the drawings are denoted by a same reference sign, and redundant description is omitted as necessary.

First Example Embodiment

A first example embodiment will be described with reference to FIG. 1. FIG. 1 is a block diagram of an information processing apparatus according to the first example embodiment. An information processing apparatus 10 shown in FIG. 1 is communicably connected to a camera that is set to capture a predetermined space, and receives image data of an image captured by the camera. The information processing apparatus 10 is also communicably connected to a predetermined information management apparatus. The information processing apparatus 10 determines whether a state of density of people in the space is appropriate or not, based on the image data received from the camera, and outputs information related to the determination to the information management apparatus. The information processing apparatus 10 according to an example embodiment of the present disclosure includes, as main structures, an image data acquisition unit 111, a measuring unit 112, a space data setting unit 113, a determination unit 114, and an output unit 115.

The image data acquisition unit 111 serves as an interface for acquiring image data that is generated by the camera mentioned above capturing the predetermined space. That is, the image data acquisition unit 111 acquires the image data of the predetermined space captured by the camera. The image data acquisition unit 111 provides the acquired image data to the measuring unit 112.

The measuring unit 112 receives the image data from the image data acquisition unit 111, and generates measurement data from the received image data. The measurement data includes a distance between persons (that is, a person-to-person distance) included in the image data. The measuring unit 112 detects, from the received image data, at least an image of a person (that is, a person image). For example, the measuring unit 112 extracts a feature of a predetermined rectangular image, and checks the same against a feature of a person image that is already held.

The measuring unit 112 may also count the number of people included in the image data, based on detected person image(s). Furthermore, the measuring unit 112 may estimate a depth of the image and an actual distance, based on the size and the like of the person image in the image data. In this case, the measuring unit 112 may measure the person-to-person distance from detected person images, based on the estimated actual distance. The measuring unit 112 provides the generated measurement data to the determination unit 114.

The space data setting unit 113 sets space data about the size of the predetermined space mentioned above. The space data is used at the time of determining whether a state of density in the predetermined space is appropriate or not. For example, the space data may be a value indicating an area size of the predetermined space. Furthermore, the space data may be an index indicating the size of the predetermined space instead of the area size.

For example, the space data setting unit 113 may set the space data by receiving an operation from a user of the information processing apparatus 10. Furthermore, the space data setting unit 113 may receive space data from the information management apparatus, and may set the received space data, for example. Furthermore, the space data setting unit 113 may set the space data by recognizing the size of the predetermined space from the image data acquired by the image data acquisition unit 111. More specifically, the space data setting unit 113 may recognize the size of a person included in the image data, the position of a wall, the size of ground or a floor surface where a person is moving, and the like, and may set the space data based on the recognized information. After setting the space data, the space data setting unit 113 supplies the set space data to the determination unit 114.

The determination unit 114 determines whether the state of density of people in the space is appropriate or not, based on the measurement data and the space data.

A result of determination performed by the determination unit 114 may indicate whether the state of density is appropriate or not by using two values or two stages, where "appropriate" is "1" and "inappropriate" is "0", for example. Alternatively, the determination result may indicate whether the state of density is appropriate or not by using indices in three or more stages. The determination unit 114 supplies the determination result to the output unit 115. Additionally, the determination result may also be referred to as determination information, determination result information, or information about a result of determination. The determination result may include information other than the determination result.

Additionally, a case where the state of density is appropriate is a case where a space is not overly crowded with people and a risk of getting infected with an infectious disease is relatively low. Furthermore, a case where the state of density is not appropriate is a case where the space is overly crowded with people and the risk of getting infected with an infectious disease is relatively high.

The output unit 115 serves as an interface that is communicably connected to the information management apparatus. The output unit 115 outputs information about the determination result received from the determination unit 114, to the information management apparatus. Additionally, the information management apparatus that is the destination of output from the output unit 115 is merely an example, and it suffices if the output unit 115 outputs the determination result in such a manner that any user or any apparatus may objectively recognize the determination result.

Figure 2:
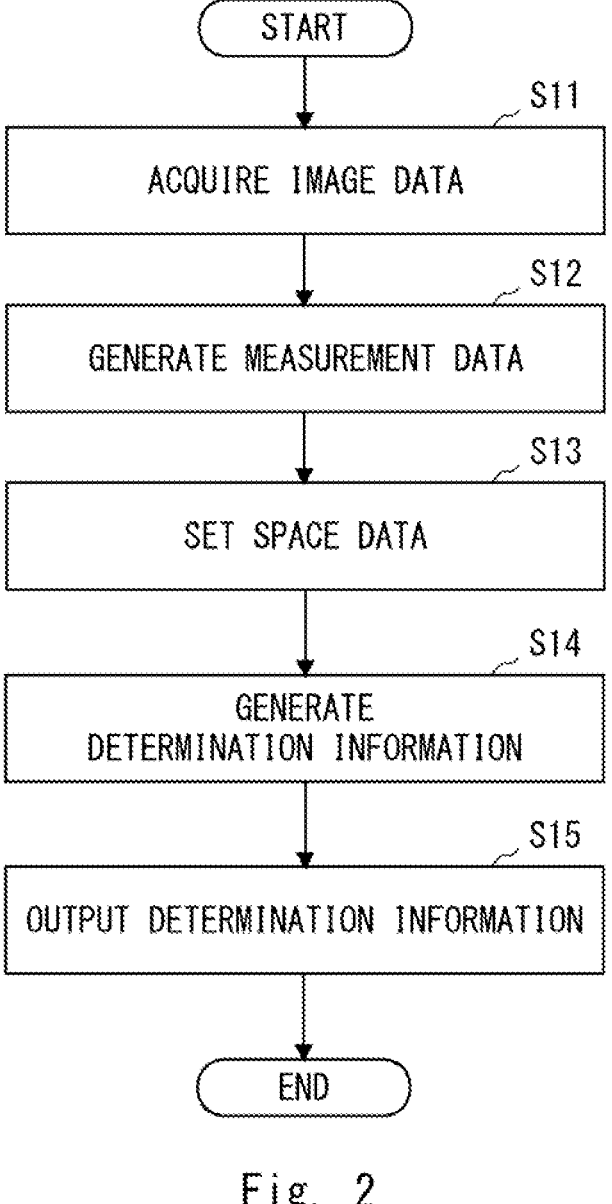
FIG. 2 is a flowchart showing an information processing method according to the first example embodiment.

Next, processes that are performed by the information processing apparatus 10 according to the first example embodiment will be described with reference to FIG. 2. FIG. 2 is a flowchart showing an information processing method according to the first example embodiment. The information processing method according to the present example embodiment is started when the information processing apparatus 10 is activated, for example.

First, the image data acquisition unit 111 acquires image data of the predetermined space captured by the camera (step S11). When the image data is acquired, the image data acquisition unit 111 supplies the acquired image data to the measuring unit 112.

Next, the measuring unit 112 receives the image data from the image data acquisition unit 111, and measures the person-to-person distance between persons included in the received image data and generates the measurement data (step S12). The measuring unit 112 supplies the generated measurement data to the determination unit 114.

Next, the space data setting unit 113 sets the space data in relation to the space (step S13). The space data setting unit 113 supplies the set space data to the determination unit 114.

Next, the determination unit 114 determines whether the state of density of people in the space is appropriate or not, based on the measurement data and the space data (step S14). The determination unit 114 supplies the determination result to the output unit 115.

Next, the output unit 115 receives the determination result from the determination unit 114, and outputs the received determination result (step S15).

The information processing method according to the first example embodiment has been described above. The processes described above may be performed every time image data is supplied from the camera to the information processing apparatus 10. Furthermore, in the processes described above, step S13 may be performed before step S12. Moreover, step S11 or step S12 may be performed in parallel with step S13.

Heretofore, the information processing apparatus according to the first example embodiment has been described. Additionally, the information processing apparatus 10 includes a processor and a storage device, which are not shown. The storage device of the information processing apparatus 10 may be a storage device including a non-volatile memory such as a flash memory or an SSD (solid state drive). In this case, the storage device of the information processing apparatus 10 stores a computer program (hereinafter sometimes simply referred to as "program") for performing the information processing method described above. Moreover, the processor causes the computer program to be read from the storage device into a buffer memory such as a DRAM (dynamic random access memory), and executes the program.

Each structure of the information processing apparatus 10 may be implemented by dedicated hardware. Furthermore, each structural element may be wholly or partly implemented by general-purpose or dedicated circuitry, a processor, or a combination thereof. These may be configured by a single chip or a plurality of chips connected by a bus. Each structural element of each device may be wholly or partly implemented by a combination of circuitry described above or the like and a program. Furthermore, as the processor, a CPU (central processing unit), a GPU (graphics processing unit), an FPGA (field-programmable gate array) or the like may be used. Additionally, description of the structures given above is applicable to other apparatuses and systems in the present disclosure described below.

Furthermore, in the case where each structural element of the information processing apparatus 10 is wholly or partly implemented by a plurality of information processing apparatuses, circuitry and the like, the plurality of information processing apparatuses, circuitry and the like may be disposed in a centralized or dispersed manner. For example, the information processing apparatus, circuitry and the like may be implemented in the form of a client-server system, a cloud computing system or the like where each is connected via a communication network. Furthermore, a function of the information processing apparatus 10 may be provided in an SaaS (Software as a Service) format.

Heretofore, the first example embodiment has been described. According to the first example embodiment, there may be provided an information processing apparatus and the like for properly determining whether the state of density in a space is appropriate or not.

Second Example Embodiment

Figure 3:
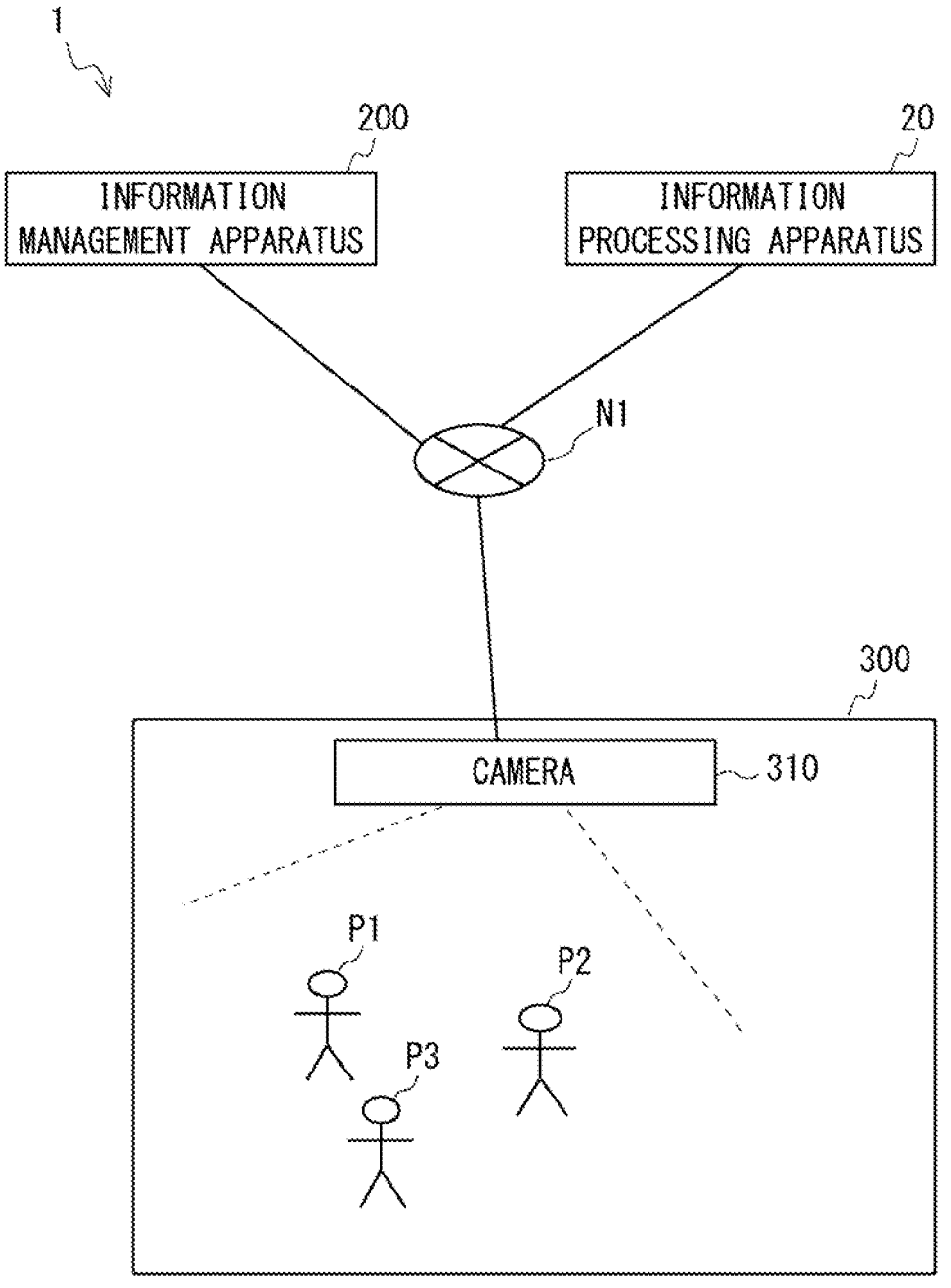
FIG. 3 is a block diagram of an information processing system according to a second example embodiment.

Next, a description will be given of a second example embodiment. FIG. 3 is a block diagram of an information processing system according to the second example embodiment. An information processing system 1 shown in FIG. 3 includes an information processing apparatus 20, an information management apparatus 200, and a camera 310. The information processing apparatus 20, the information management apparatus 200, and the camera 310 are communicably connected via a network N1. The network N1 may be a LAN (local area network) or a WAN (wide area network).

The information processing apparatus 20 acquires image data from the camera 310, determines whether the state of density in a space 300 is appropriate or not, based on the acquired image data, and supplies the determination result to the information management apparatus 200. The information management apparatus 200 receives the determination result from the information processing apparatus 20, and accumulates the received determination result. Furthermore, the information management apparatus 200 displays the determination result received from the information processing apparatus 20.

The camera 310 is installed in the space 300, and is set to capture a scene in the space 300. The space 300 is a predetermined space where a plurality of persons may be present. For example, the space 300 is a conference room, an office room, a classroom, a concert hall, a gymnasium, a restaurant, a shop, a shopping mall, a square, an assembly hall or the like. The camera 310 supplies image data generated by capturing a scene in the space 300, to the information processing apparatus 20 via the network N1. Additionally, there may be one camera 310, or two or more cameras 310. In the example shown in FIG. 3, persons P1 to P3 are present in the space 300. The camera 310 captures a scene including the persons P1 to P3 and generates image data, and supplies the generated image data to the information processing apparatus 20.

Next, a description will be given of the information management apparatus 200 with reference to FIG. 4. FIG. 4 is a block diagram of the information management apparatus according to the second example embodiment. The information management apparatus 200 may be a smartphone, a tablet terminal, a personal computer, a server or the like. As main structures, the information management apparatus 200 includes a determination result acquisition unit 211, an information input unit 212, a communication unit 213, a control unit 214, a display unit 215, and a storage unit 220.

The determination result acquisition unit 211 receives a determination result from the information processing apparatus 10. After receiving the determination result, the determination result acquisition unit 211 may supply the received determination result to the storage unit according to an instruction from the control unit 214. Furthermore, the determination result acquisition unit 211 may supply the determination result to the display unit 215 according to an instruction from the control unit 214.

The information input unit 212 receives an input from an information input device such as a keyboard or a touch panel, for example. The information input unit 212 supplies the received information to the control unit 214. The communication unit 213 is an interface for performing communication between the information management apparatus 200 and the information processing apparatus 20.

The control unit 214 includes an arithmetic device such as a CPU, and controls each structure in the information management apparatus 200. The control unit 214 reads a program from the storage unit 220, and executes a predetermined function of the present example embodiment according to the program that is read.

The display unit 215 is a display device including a liquid crystal panel or an organic electroluminescence panel, for example, and visually displays predetermined information to a user. For example, the display unit 215 displays the determination result that is acquired by the determination result acquisition unit 211.

The storage unit 220 is a storage device including a non-volatile memory, and at least stores a program for causing the information management apparatus 200 to execute the function of the present example embodiment.

Figure 5:
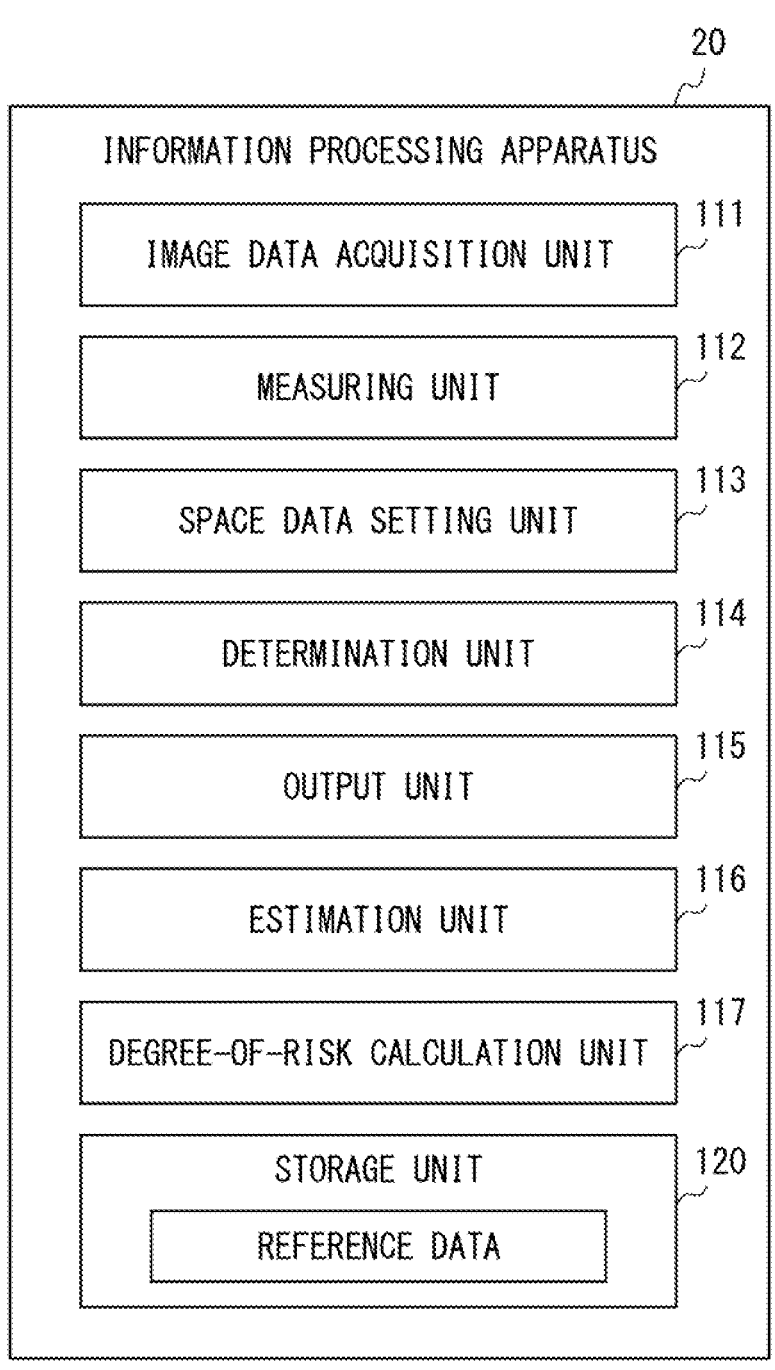
FIG. 5 is a block diagram of an information processing apparatus according to the second example embodiment.

Next, a description will be given of the information processing apparatus 20 with reference to FIG. 5. FIG. 5 is a block diagram of the information processing apparatus 20 according to the second example embodiment. The information processing apparatus 20 is different from the information processing apparatus 10 according to the first example embodiment in that the information processing apparatus 20 includes an estimation unit 116, a degree-of-risk calculation unit 117, and a storage unit 120. Furthermore, the structures of the information processing apparatus 20 are different from those in the first example embodiment in the following manner.

The determination unit 114 according to the present example embodiment sets reference data about the person-to-person distance relative to the size of the space 300 by using the space data. The reference data is predetermined data about the person-to-person distance, and is used for comparison with the measurement data at the time of determination of the state of density by the determination unit 114. More specifically, the reference data includes a threshold for the person-to-person distance, for example. In the case where the area size of a predetermined space is included in the space data, the determination unit 114 may set the threshold for the person-to-person distance according to the area size. In this case, the determination unit 114 may access a database indicating a relationship between space data and person-to-person distance and may acquire the person-to-person distance corresponding to the area size in the space data in the database. Alternatively, the determination unit 114 may calculate the threshold for the person-to-person distance by performing predetermined arithmetic processing based on the space data. In the same manner, in the case where the space data includes an index indicating the size of a predetermined space, the determination unit 114 may set the threshold for the person-to-person distance according to the index. In the case where the space data includes the threshold for the person-to-person distance, the determination unit 114 may set the threshold as the reference data. The reference data may set a threshold for the number of people in a predetermined space, in addition to data about the person-to-person distance. The determination unit 114 may thus set a threshold corresponding to an appropriate state of density in each space. The determination unit 114 determines whether the state of density is appropriate or not by comparing the measurement data and the reference data. The information processing apparatus 20 may thus properly determine whether the state of density is appropriate or not, according to the size of the space.

The measuring unit 112 according to the present example embodiment may generate statistical data about the person-to-person distance, as the measurement data. The statistical data about the person-to-person distance here is an average value of person-to-person distances between persons in the predetermined space 300. The statistical data may be a median value, a minimum value, or a moving average calculated taking past measurement data into account, for example. As described later, a statistical value may be data classified into categories by which a histogram may be formed. The information processing apparatus 20 may thus determine whether the state of density is appropriate or not from various points of view. The determination unit 114 sets, as the reference data, data that corresponds to the size of the space 300 and that may be compared with the measurement data, by using the space data. By using statistical data as the reference data in this manner, the information processing apparatus 20 may more accurately determine whether the state of density is appropriate or not.

The determination unit 114 may set one piece of reference data using pieces of measurement data for a plurality of different times. In this case, the determination unit 114 may calculate an average value of the plurality of pieces of measurement data and set the same as the reference data, for example. Additionally, the average value may be a moving average or a weighted average.

The estimation unit 116 estimates the measurement data for a predetermined set time, and generates estimated data for the set time. The estimated data is the measurement data for a set time that is estimated from past measurement data for before the set time. More specifically, the estimation unit 116 estimates the measurement data for a set time by using pieces of measurement data for a plurality of different times in the past. For example, the estimation unit 116 may generate the estimated data by machine learning. Furthermore, the estimation unit 116 may generate the estimated data for each time, based on the measurement data for a time slot in the past that corresponds to that of the set time.

In this case, the determination unit 114 performs determination according to the estimated data, based on the estimated data and the space data. The information processing apparatus 20 may thus estimate a future state of density in the predetermined space. Accordingly, the information processing apparatus 20 may notify a user of a possible increase in an infection risk before the infection risk in the space becomes high.

The degree-of-risk calculation unit 117 estimates the degree of risk when a predetermined person moves through the space 300. The degree of risk is an index that is calculated by estimating the state of density in the space generated at the time of a predetermined person moving through the space 300. For example, the degree of risk may be indicated using two values of "safe" and "risky", or may be indicated by indices in three or more stages. The degree of risk in the present example embodiment is an index indicating the infection risk of an infectious disease. That is, in the case where the degree of risk is relatively high, the infection risk is high. The degree-of-risk calculation unit 117 estimates the degree of risk when a predetermined person enters the space 300 at the set time, by using the determination result according to the estimated data described above. The information processing apparatus 20 may thus reduce the infection risk that is due to entering the predetermined space.

The storage unit 120 includes a non-volatile memory, and stores the reference data that is set by the determination unit 114, for example. The storage unit 120 may also store pieces of measurement data for a plurality of times.

The configuration of the information processing apparatus 20 has been described above, but the configuration of the information processing apparatus 20 is not limited to the one described above. For example, the measuring unit 112 may measure a moving speed of a person based on pieces of image data for a plurality of different times. In this case, the measuring unit 112 generates measurement data including the moving speed of the person, and the determination unit 114 performs determination by taking the moving speed into account. For example, in the case where the moving speed of a person is relatively slow, it is highly likely that people are clustered to such a degree that movement is difficult. By taking the moving speed into account, the information processing apparatus 20 may more properly determine whether the state of density is appropriate or not.

Furthermore, the space data setting unit 113 according to the present example embodiment may receive, as the space data, a value about the number of people that is acceptable in relation to the size of the space 300, and may set the received value as the space data. In this case, a user using the information processing apparatus 20 may input the space data, for example. Furthermore, a user using the information management apparatus 200 may send the space data to the information processing apparatus 20, and the information processing apparatus 20 may receive the same, for example. Moreover, in this case, the determination unit 114 may set, as the reference data, the value about the number of people that is received as the space data, for example. In this case, for example, the determination unit 114 further compares data about the number of people included in measurement data with the reference data that is set, and determines that the state of density is not appropriate, in a case where the number of people included in the measurement data is greater than in the reference data. By contrast, in the case where the number of people included in the measurement data is not greater than the reference data, the determination unit 114 determines that the state of density is appropriate, for example.

Furthermore, the space data setting unit 113 according to the present example embodiment may set, as the space data, a limit value of the person-to-person distance that is acceptable in relation to the size of the space 300. Also in this case, a user using the information processing apparatus 20 may input the space data, for example. Furthermore, a user using the information management apparatus 200 may send the space data to the information processing apparatus 20, and the information processing apparatus 20 may receive the same, for example. Moreover, in this case, the determination unit 114 may set, as the reference data, the value about the person-to-person distance that is received as the space data, for example. In this case, for example, the determination unit 114 further compares the data about the person-to-person distance included in measurement data with the reference data that is set, and determines that the state of density is not appropriate, in a case where the person-to-person distance included in the measurement data is smaller than in the reference data. By contrast, in the case where the person-to-person distance included in the measurement data is not smaller than the reference data, the determination unit 114 determines that the state of density is appropriate, for example.

Furthermore, the space data may include data setting the number or the proportion of people who are present within a short distance below the threshold. Accordingly, in a case where family members or friends are moving together, for example, the determination unit 114 may perform determination while regarding the group as an exception in relation to the state of density.

Figure 6:
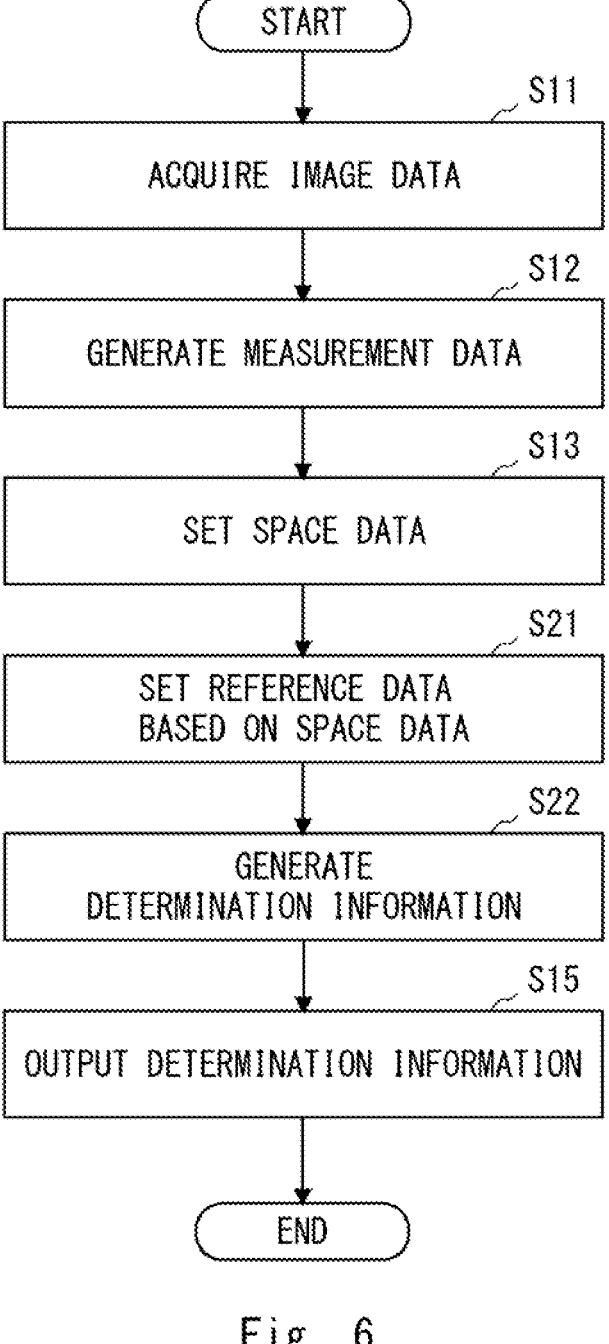
FIG. 6 is a flowchart related to the information processing apparatus according to the second example embodiment.

Next, processes that are performed by the information processing apparatus 20 according to the second example embodiment will be described with reference to FIG. 6. FIG. 6 is a flowchart related to the information processing apparatus 20 according to the second example embodiment. With the flowchart shown in FIG. 6, processes between step S13 and step S15 are different from those in the first example embodiment.

After step S13, the determination unit 114 of the information processing apparatus 20 sets the reference data based on the space data (step S21). Furthermore, the determination unit 114 performs determination based on the set reference data and the measurement data (step S22). Moreover, the output unit 115 receives the determination result from the determination unit 114, and outputs the received determination result (step S15).

Additionally, the space data in step S13 may be a fixed value that is set in advance and that is stored in the storage unit 120. In this case, in step S13, the space data setting unit 113 may set the space data by reading the space data from the storage unit 120, for example.

Figure 7:
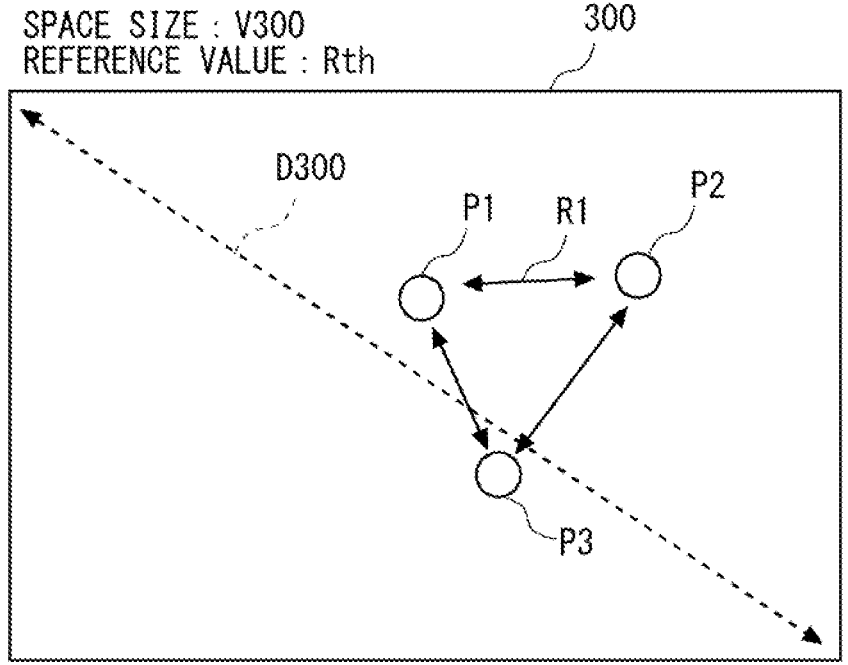
FIG. 7 is a first diagram showing an example of a relationship between space and state of density.

Next, a relationship between space and state of density will be described citing specific examples. FIG. 7 is a first diagram showing an example of the relationship between space and state of density. FIG. 7 schematically shows the space 300 and persons P1 to P3 present in the space 300. The space data about the space 300 shown in FIG. 7 is assumed to include a size V300. The size V300 is an index indicating the size of the space 300, and may be the area size or a relative value that allows the information processing apparatus 20 to identify the size of the space, for example. Furthermore, the size V300 may be a length of one side of the space 300, or a length of a diagonal line D300 indicated by a dotted line in the drawing.

The person-to-person distance between the person P1 and the person P2 shown in FIG. 7 is a distance R1. The person-to-person distance between the person P2 and the person P3 is equal to the distance R1 or is greater than the distance R1. Likewise, the person-to-person distance between the person P3 and the person P1 is equal to the distance R1 or is greater than the distance R1. Furthermore, the distance R1 is greater than a predetermined distance called social distance (for example, 2 meters).

In the state described above, the determination unit 114 determines whether the state of density in the space 300 is appropriate or not, based on the person-to-person distances of the persons P1 to P3 and the space data. Here, the determination unit 114 determines whether the person-to-person distances are appropriate or not by comparing the person-to-person distances with the size of the space 300. In the case of the example shown in FIG. 7, the distance R1 is about 15% of the diagonal line D300, for example. That is, the distance R1 is small compared with the size of the space 300. Furthermore, in the example shown in FIG. 7, the determination unit 114 sets a reference value for the person-to-person distance to Rth greater than R1, based on the space data. Accordingly, the determination unit 114 does not determine that the state of density in the space 300 shown in FIG. 7 is appropriate.

Figure 8:
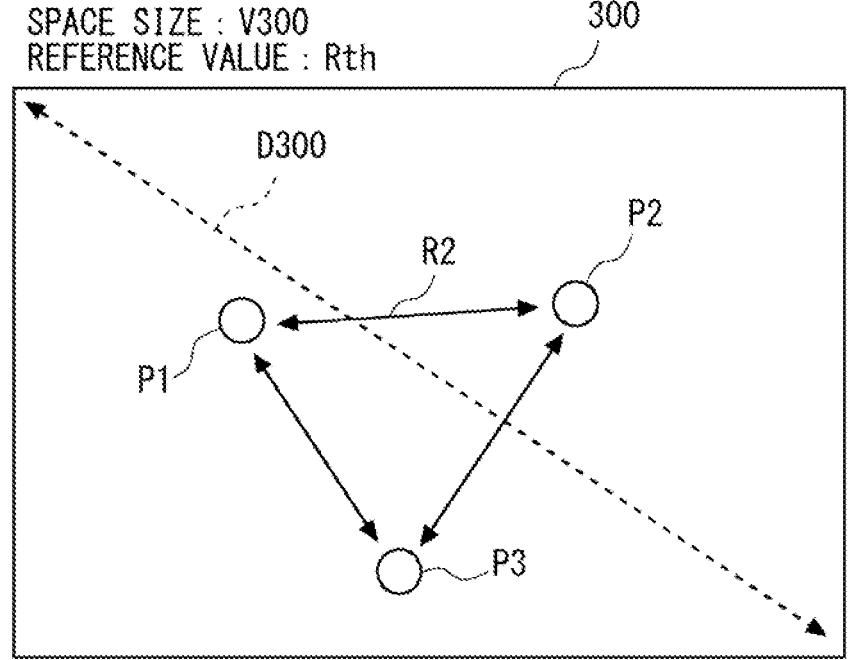
FIG. 8 is a second diagram showing an example of the relationship between space and state of density.

Next, an example shown in FIG. 8 will be described. FIG. 8 is a second diagram showing the relationship between space and state of density. In the example shown in FIG. 8, the distance between the person P1 and the person P2 is a distance R2 greater than the distance R1. Furthermore, the person-to-person distance between the person P2 and the person P3 is equal to the distance R2 or is greater than the distance R2. Likewise, the person-to-person distance between the person P3 and the person P1 is equal to the distance R2 or is greater than the distance R2.

The determination unit 114 determines whether the state of density in the space 300 is appropriate or not in the state described above. In the case of the example shown in FIG.

8, the distance R2 is about 30% of the diagonal line D300, for example. Furthermore, in the example shown in FIG. 8, the reference value Rth set by the determination unit 114 is smaller than the distance R2. Accordingly, the determination unit 114 determines that the state of density in the space 300 shown in FIG. 8 is appropriate. According to the configuration described above, the information processing apparatus 20 may set an appropriate state of density on a per-space basis, and may determine whether the state of density in a space is appropriate or not.

Figure 9:
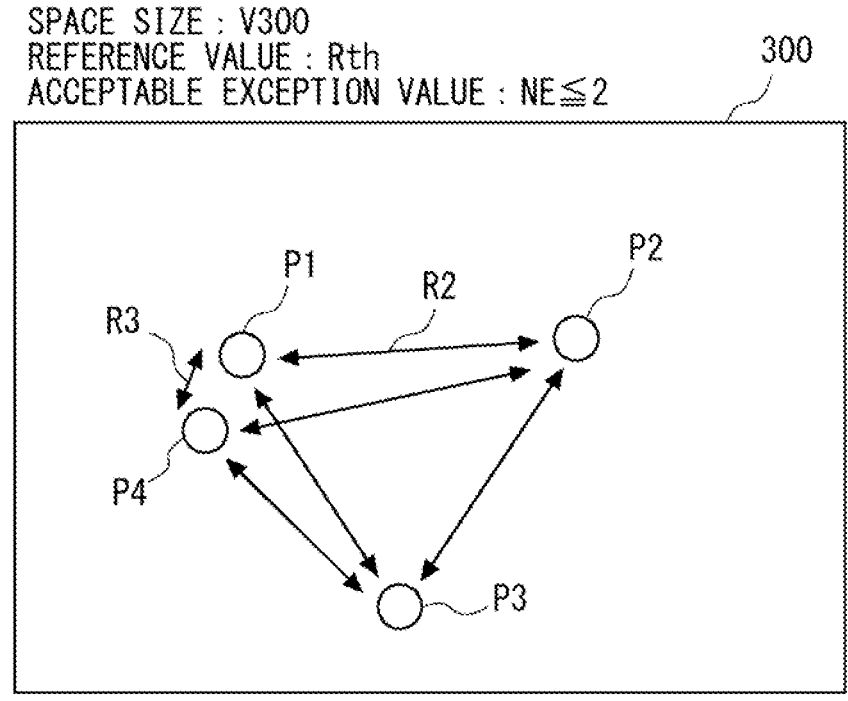
FIG. 9 is a third diagram showing an example of the relationship between space and state of density.

Next, FIG. 9 will be described. FIG. 9 is a third diagram showing an example of the relationship between space and state of density. In the example shown in FIG. 9, in addition to the persons P1 to P3, a person P4 is present near the person P1. Positions of the persons P1 to P3 are the same as in FIG. 8. The distance between the person P1 and the person P4 is a distance R3. The distance R3 is smaller than the reference value Rth. Furthermore, the distance between the person P4 and the person P2 and the distance between the person P4 and the person P3 are equal to the distance R2 and are greater than the reference value Rth.

In the case of the example shown in FIG. 9, in the state described above, the space data indicates an acceptable exception value, in addition to the data about the size of the space. The acceptable exception value indicates the counted number of measurement targets for whom the person-to-person distance is smaller than the threshold. In FIG. 9, an acceptable exception value NE is two or less. That is, in the case of the example in FIG. 9, the determination unit 114 determines that the state of density in the space is appropriate when there are two or less measurement targets for whom the person-to-person distance in the space 300 is determined to be smaller than the threshold Rth.

In the case of the example shown in FIG. 9, only the distance R3 between the person P1 and the P4 takes a value that is smaller than the threshold Rth. Accordingly, in this case, the determination unit 114 determines that the state of density in the space 300 is appropriate. According to such a configuration, the information processing apparatus 20 may determine the state of density in a space while allowing the person-to-person distance between persons who are closely related to each other, such as family members, to be below the threshold.

Figure 10:
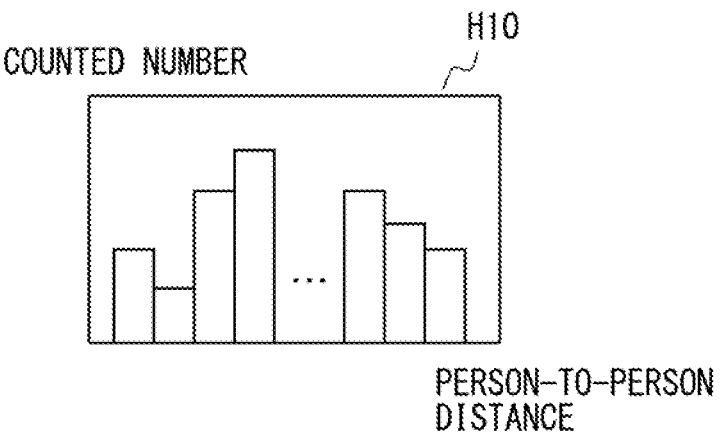
FIG. 10 is a diagram showing an example of measurement data generated by a measuring unit.

Next, an example of the measurement data will be described with reference to FIG. 10. FIG. 10 is an example of the measurement data that is generated by the measuring unit. FIG. 10 shows a graph H10. The graph H10 is a histogram, where a horizontal axis is the person-to-person distance and a vertical axis is the counted number. When the measuring unit 112 generates the measurement data corresponding to the histogram as shown by the graph H10, the information processing apparatus 20 is enabled to more accurately analyze the state of density in the entire space. Furthermore, by comparing the histograms for different times, the determination unit 114 may detect tendency of change in the state of density.

The determination unit 114 may determine that the state of density is not appropriate, in the case where a difference between the measurement data shown in FIG. 10 and a histogram as the reference data is greater than a predetermined range.

Heretofore, the second example embodiment has been described. According to the second example embodiment, there may be provided an information processing apparatus and the like for properly determining whether the state of density in a space is appropriate or not.

Third Example Embodiment

Figure 11:
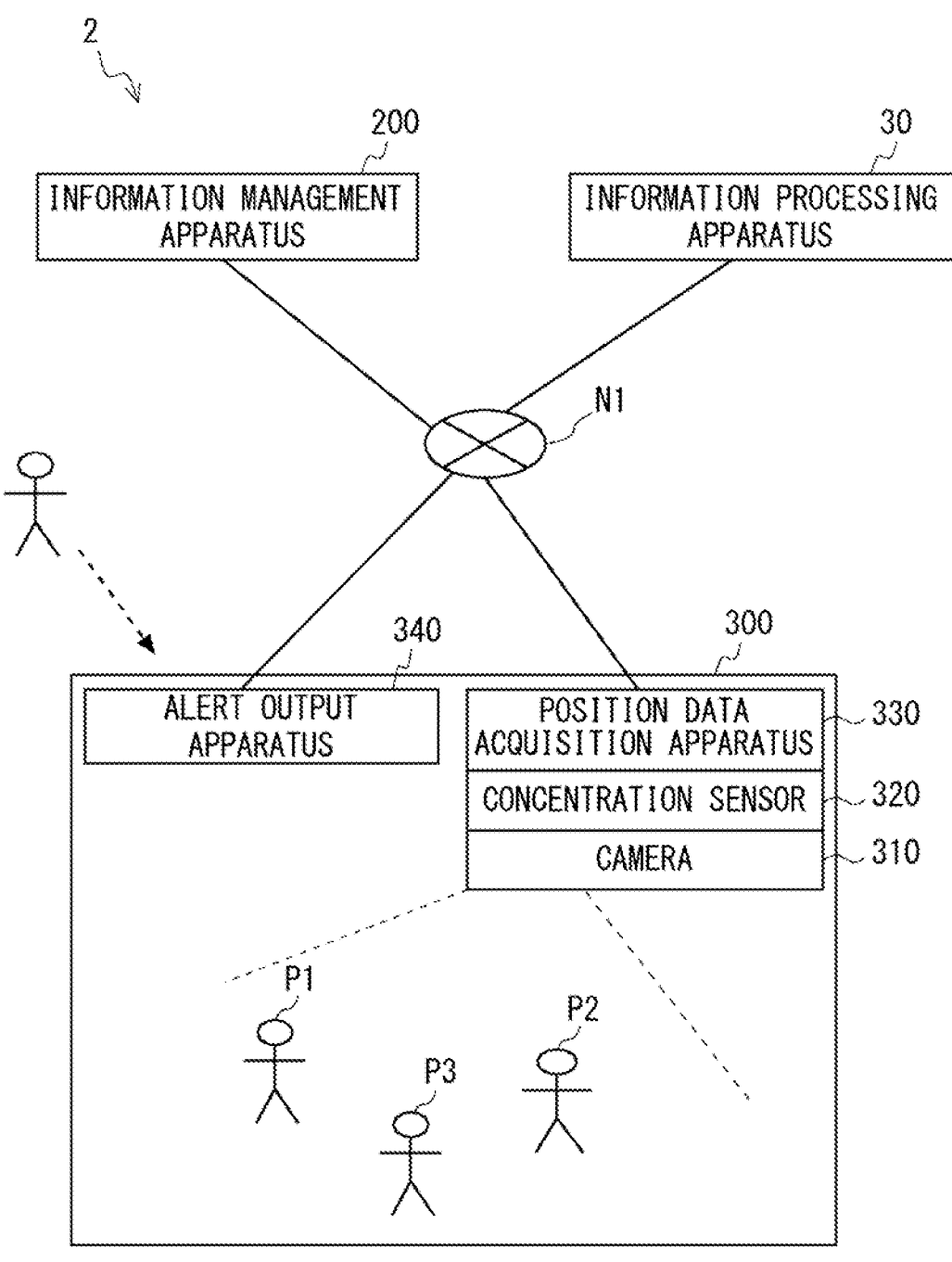
FIG. 11 is a block diagram of an information processing system according to a third example embodiment.

Next, a description will be given of a third example embodiment. An information processing system 2 according to the third example embodiment is different from that in the second example embodiment in that the information processing system 2 includes a concentration sensor 320, a position data acquisition apparatus 330, and an alert output apparatus 340. FIG. 11 is a block diagram of the information processing system 2 according to the third example embodiment.

In the space 300, the information processing system 2 includes the concentration sensor 320 and the position data acquisition apparatus 330, in addition to the camera 310.

The concentration sensor 320 measures concentration of $CO_2$ (carbon dioxide) in the air inside the space 300. Generally, in a room, the amount of $CO_2$ emitted by people per unit time is increased as the number of people is increased. Accordingly, by measuring the concentration of $CO_2$, the number of people in the space 300 may be estimated. The concentration sensor 320 supplies $CO_2$ data that is data about the concentration of $CO_2$ to the information processing apparatus 30 via the network N1. That is, by including the concentration sensor 320, the information processing system 2 is able to estimate the number of people in a room even when the camera 310 cannot be installed in the space. Alternatively, by using the concentration sensor 320 in combination with the camera 310, the information processing system 2 is able to estimate the number of people in a predetermined space.

The position data acquisition apparatus 330 acquires position data of a mobile terminal that is carried by each person present in the space 300. For example, the position data acquisition apparatus 330 acquires a signal including a unique identifier and position data that is transmitted by the mobile terminal. When the position data is acquired, the position data acquisition apparatus 330 supplies the acquired position data to the information processing apparatus 30 via the network N1.

By including the position data acquisition apparatus 330, the information processing system 2 may grasp an approximate position of a person indoors or outdoors. Accordingly, for example, the information processing system 2 may estimate the number and positions of people in a space where the camera 310 cannot be installed, by using the concentration sensor 320 and the position data acquisition apparatus 330. Furthermore, because the camera 310, the concentration sensor 320, and the position data acquisition apparatus 330 are included, accuracy of the number and positions of people measured by the information processing system 2 may be increased.

The information processing apparatus 30 according to the present example embodiment acquires the image data from the camera 310, acquires the $CO_2$ data from the concentration sensor 320, and acquires the position data of a mobile terminal carried by a person from the position data acquisition apparatus 330. The information processing apparatus 30 performs determination based on these pieces of data and the space data about the space 300. When determination is performed by the determination unit 114, the information processing apparatus 30 supplies the determination result to the alert output apparatus 340. The determination result here may include information about an alert.

The alert output apparatus 340 acquires the determination result from the information processing apparatus 30 via the network N1, and outputs an alert signal according to details of the received determination result. The alert signal that is output by the alert output apparatus 340 is notified to a person who is present nearby through sound, image, light, or a combination thereof, for example. That is, the alert output apparatus 340 includes a speaker, a display, or a light emitting device as means for notifying a person of the alert signal. For example, the alert output apparatus 340 is installed at an entrance of the space 300, and outputs a predetermined alert to a person trying to enter the space 300. The alert output apparatus 340 may also output a predetermined alert to a person present in the space 300.

The alert output apparatus 340 receives, from the determination result, an alert signal based on information indicating whether the state of density in the space 300 is appropriate or not. For example, the alert output apparatus 340 may transmit a message for preventing entrance into the space 300. The information processing system 2 may thus efficiently promote improvement in the state of density in the space 300.

Figure 12:
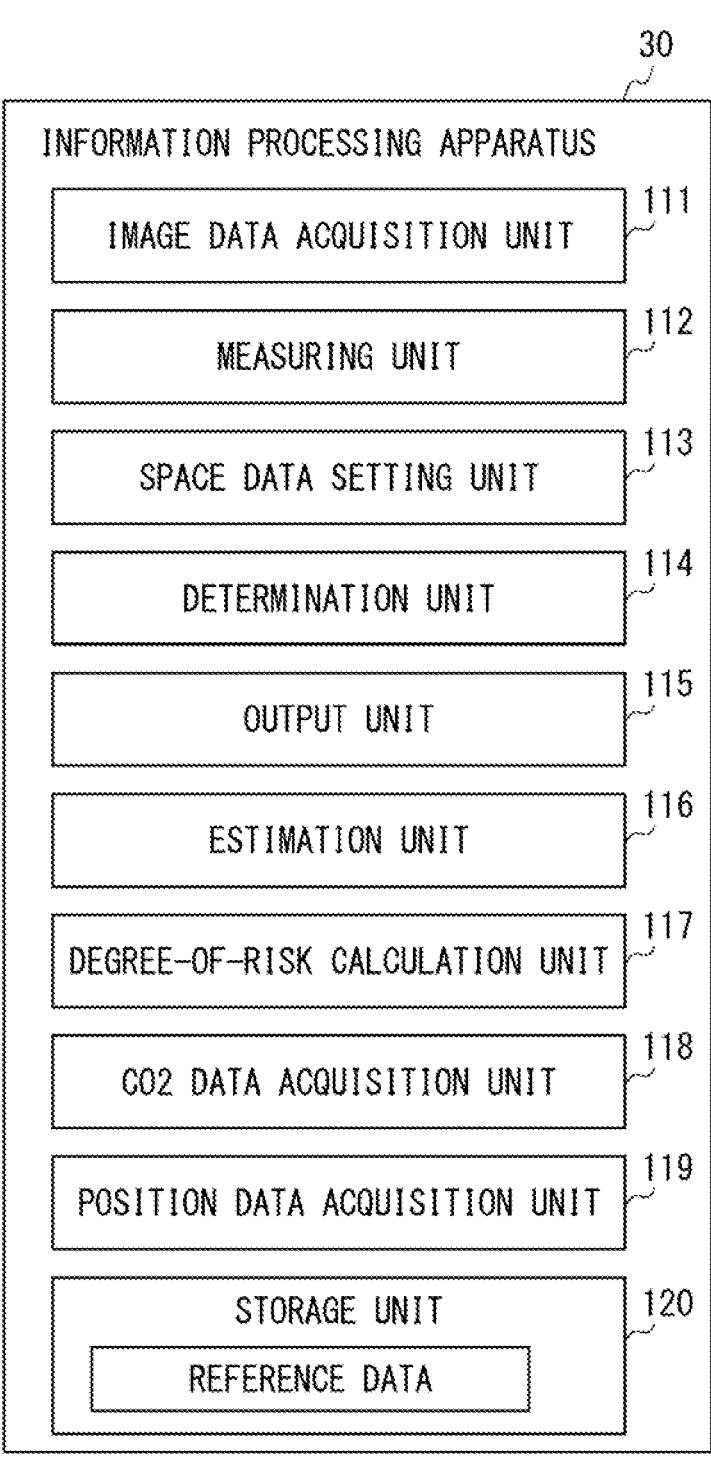
FIG. 12 is a block diagram of an information processing apparatus according to the third example embodiment.

Next, a description will be given of the information processing apparatus 30 with reference to FIG. 12. FIG. 12 is a block diagram of the information processing apparatus according to the third example embodiment. The information processing apparatus 30 shown in FIG. 12 is different from the information processing apparatus 20 according to the second example embodiment in that the information processing apparatus 30 includes a CO2 data acquisition unit 118 and a position data acquisition unit 119.

The CO2 data acquisition unit 118 acquires, from the concentration sensor 320 for measuring the concentration of carbon dioxide in the space 300, the CO2 data that is data about the concentration of carbon dioxide. When the CO2 data is acquired, the CO2 data acquisition unit 118 supplies the acquired CO2 data to the measuring unit 112. In this case, the measuring unit 112 estimates the number of people in the space 300 based on the concentration of CO2 included in the received CO2 data. The measuring unit 112 generates the measurement data based on the number of people estimated in the above manner and the number of people counted from the image data.

The position data acquisition unit 119 acquires the position data of a mobile terminal that is carried by each person in the space 300, via the position data acquisition apparatus 330. When the position data is acquired, the position data acquisition unit 119 supplies the acquired position data to the measuring unit 112. In this case, the measuring unit 112 is able to estimate the person-to-person distance based on the position data.

When determining that the state of density is not appropriate, the determination unit 114 according to the present example embodiment activates a timer at a time point of output of a determination result indicating that the state of density is not appropriate. Then, output of a determination result indicating that the state of density is appropriate is prevented until after a predetermined period of time after the determination described above.

Alternatively, when determining that the state of density is appropriate after determining that the state of density is not appropriate, the determination unit 114 may activate the timer at a time point of determining that the state of density changed from an inappropriate state to an appropriate state, and may prevent a determination result indicating that the state of density is appropriate from being output until after a predetermined period of time.

The timer mentioned above may be set according to a ventilation state of air in the space 300, for example. Furthermore, this ventilation state may be set as the space data. This allows the information processing apparatus 30 to keep outputting the alert signal until the state of density in the space is improved. Additionally, the output unit 115 according to the present example embodiment outputs the alert signal to the alert output apparatus 340, in addition to the determination result.

Figure 13:
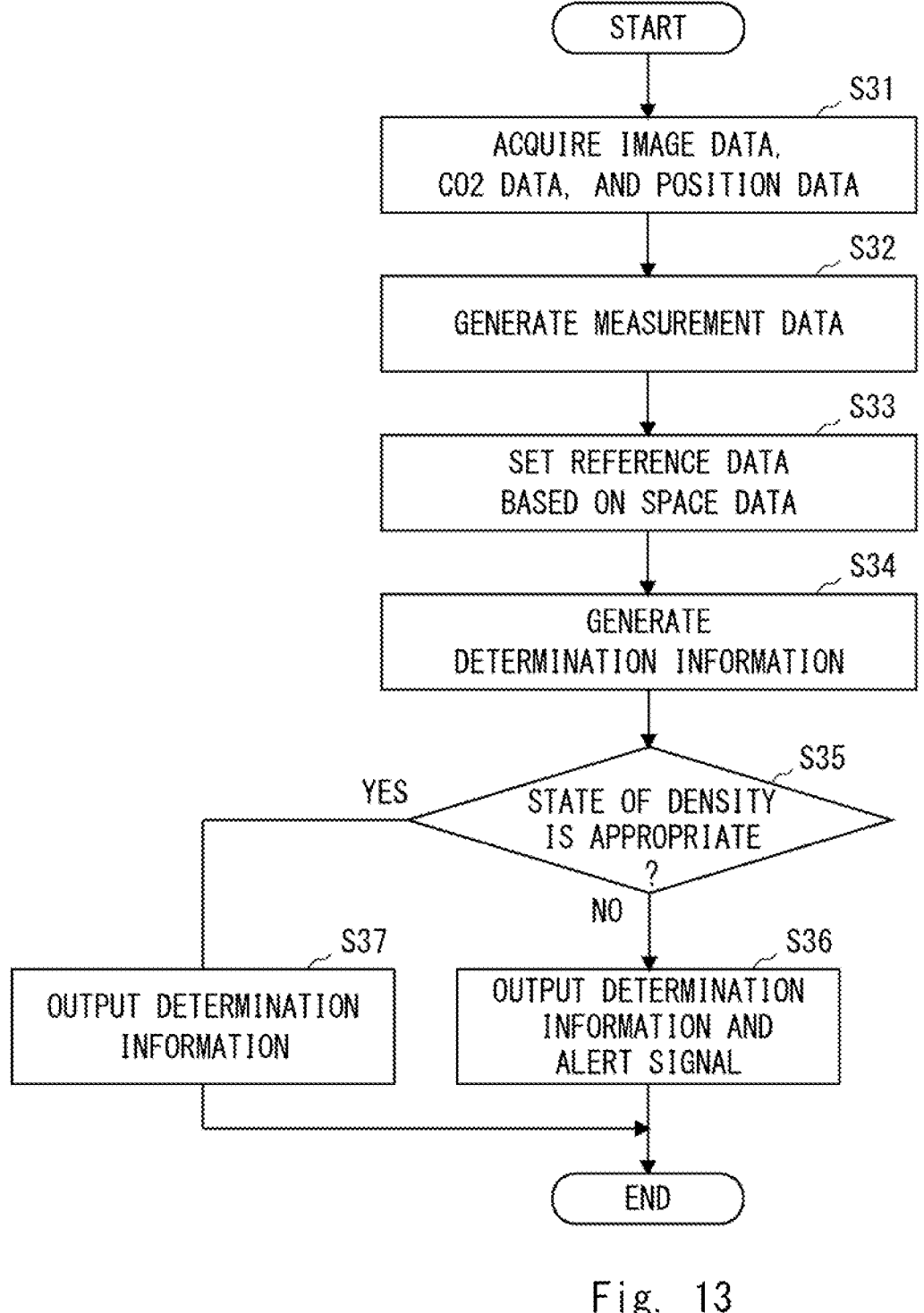
FIG. 13 is a flowchart related to the information processing apparatus according to the third example embodiment.

Next, processes performed by the information processing apparatus 30 will be described with reference to FIG. 13. FIG. 13 is a flowchart related to the information processing apparatus according to the third example embodiment.

First, the image data acquisition unit 111, the CO2 data acquisition unit 118, and the position data acquisition unit 119 of the information processing apparatus 30 acquire the image data, the CO2 data, and the position data, respectively (step S31). The image data acquisition unit 111, the CO2 data acquisition unit 118, and the position data acquisition unit 119 of the information processing apparatus 30 supply the acquired pieces of data to the measuring unit 112.

Next, the measuring unit 112 generates the measurement data based on the image data, the CO2 data, and the position data that are received (step S32). The measuring unit 112 supplies the generated measurement data to the determination unit 114.

Next, the determination unit 114 sets the reference data based on the space data (step S33). Then, the determination unit 114 performs determination based on the measurement data and the reference data (step S34).

Next, the determination unit 114 determines whether the state of density is appropriate or not (step S35). In the case where the state of density is determined to be appropriate (step S35: YES), the output unit 115 outputs a determination result indicating that the state of density is appropriate (step S37), and the process is ended. By contrast, in the case where the state of density is not determined to be appropriate (step S35: NO), the output unit 115 outputs a determination result indicating that the state of density is not appropriate and an alert signal (step S36), and the process is ended.

Heretofore, the third example embodiment has been described. According to the third example embodiment, there may be provided an information processing apparatus and the like for properly determining whether the state of density in a space is appropriate or not.

<Example Hardware Configuration>

In the following, a description will be given of a case where each functional structure of the information processing apparatuses according to the present disclosure is implemented by a combination of hardware and software.

Figure 14:
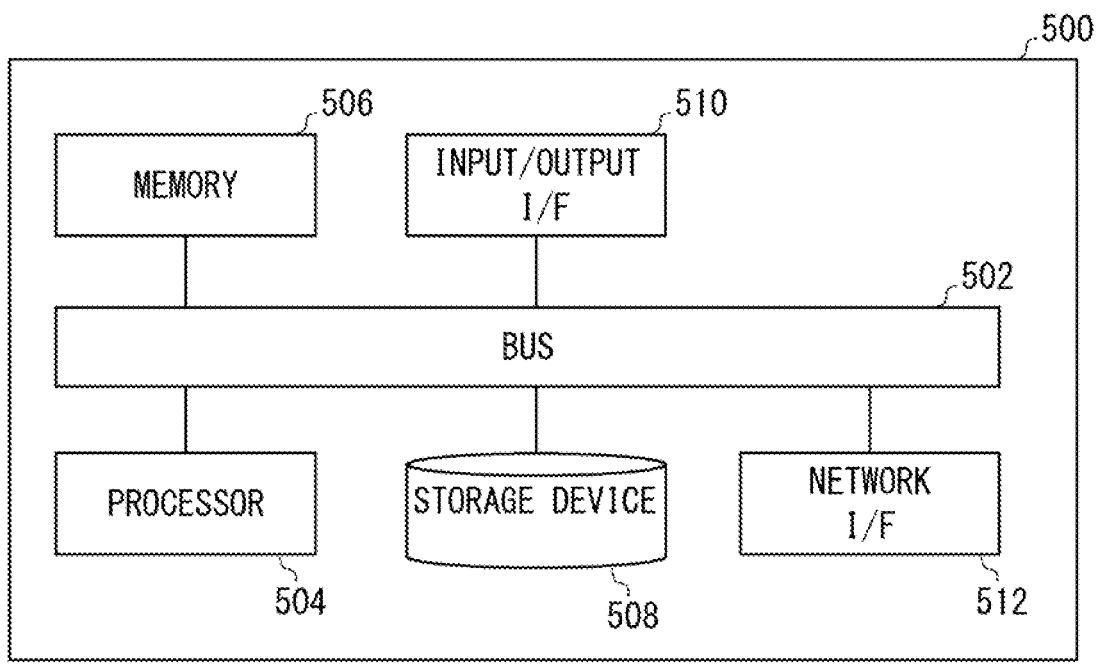
FIG. 14 is a block diagram showing an example of a hardware configuration of a computer.

FIG. 14 is a block diagram showing an example of a hardware configuration of a computer. The information processing apparatuses according to the present disclosure may implement the functions described above by a computer 500 having the hardware configuration shown in the drawing. The computer 500 may be a portable computer such as a smartphone or a tablet terminal, or a stationary computer such as a PC. The computer 500 may be a dedicated computer that is designed to achieve each apparatus, or may be a general-purpose computer. The computer 500 may implement a desired function by having a predetermined application installed therein.

The computer 500 includes a bus 502, a processor 504, a memory 506, a storage device 508, an input/output interface (I/F) 510, and a network interface (I/F) 512. The bus 502 is a data transmission channel for transmission/reception of data among the processor 504, the memory 506, the storage device 508, the input/output interface 510, and the network interface 512. Additionally, the method of connecting the processor 504 and the like to one another is not limited to connection by a bus.

The processor 504 may be any of various processors such as a CPU, a GPU, and an FPGA. The memory 506 is a main storage device that is implemented using a RAM (random access memory) or the like.

The storage device 508 is an auxiliary storage device that is implemented using a hard disk, an SSD, a memory card, a read only memory (ROM) or the like. The storage device 508 stores programs for implementing desired functions. The processor 504 reads the programs into the memory 506 and executes the programs, and each functional structure of each apparatus is thus implemented.

The input/output interface 510 is an interface for connecting the computer 500 and an input/output device. For example, an input device such as a keyboard, and an output device such as a display device are connected to the input/output interface 510.

The network interface 512 is an interface for connecting the computer 500 to a network.

Additionally, the present disclosure is not limited to the example embodiments described above, and modifications may be made as appropriate within the scope of the disclosure.

The whole or part of the exemplary embodiments disclosed above can be described as, but not limited to, the following supplementary notes.

(Supplementary Note 1)

An information processing apparatus including:

image data acquisition means for acquiring image data of a predetermined space captured by a camera;

measuring means for generating measurement data including a person-to-person distance between persons included in the image data;

space data setting means for setting space data about a size of the space;

determination means for determining whether a state of density of the persons in the space is appropriate or not, based on the measurement data and the space data; and output means for outputting a result of the determination.

(Supplementary Note 2)

The information processing apparatus according to Supplementary note 1, wherein the determination means sets reference data about the person-to-person distance in the space based on the space data, and performs determination based on the measurement data and the reference data.

(Supplementary Note 3)

The information processing apparatus according to Supplementary note 2, wherein the measuring means generates, as the measurement data, statistical data about the person-to-person distance, and the determination means sets the reference data corresponding to the statistical data for the space, based on the space data.

(Supplementary Note 4)

The information processing apparatus according to any one of Supplementary notes 1 to 3, wherein the measuring means generates the measurement data including the number of the persons included in the image data, and the determination means performs determination by taking the number of the persons into account.

(Supplementary Note 5)

The information processing apparatus according to any one of Supplementary notes 1 to 4, wherein the measuring means generates the measurement data including moving speeds of the persons, and the determination means performs determination by taking the moving speeds into account.

(Supplementary Note 6)

The information processing apparatus according to Supplementary note 2 or 3, wherein the determination means sets the reference data based on the measurement data for each of a plurality of different times.

(Supplementary Note 7)

The information processing apparatus according to any one of Supplementary notes 1 to 6, further including estimation means for generating estimated data by estimating the measurement data for a predetermined set time based on the measurement data for each of a plurality of different times before the set time, wherein the determination means performs determination according to the estimated data, based on the estimated data and the space data.

(Supplementary Note 8)

The information processing apparatus according to Supplementary note 7, further including degree-of-risk estimation means for estimating a degree of risk when a predetermined person enters the space at the set time, based on determination information according to the estimated data.

(Supplementary Note 9)

The information processing apparatus according to Supplementary note 4 further including $CO_2$ data acquisition means for acquiring $CO_2$ data that is data about concentration of carbon dioxide, from a concentration sensor for measuring the concentration of carbon dioxide in the space, wherein the measuring means generates the measurement data by estimating the number of the persons based on the $CO_2$ data.

(Supplementary Note 10)

The information processing apparatus according to Supplementary note 9, further including position data acquisition means for acquiring position data of a mobile terminal carried by each of the persons in the space, wherein the measuring means generates the measurement data by estimating the person-to-person distance based on the position data.

(Supplementary Note 11)

The information processing apparatus according to any one of Supplementary notes 1 to 10, wherein, in a case where the state of density is determined to be not appropriate, the determination means prevents output of the determination result indicating that the state of density is appropriate, until after a predetermined period of time after the determination.

(Supplementary Note 12)

An information processing system including:

the information processing apparatus according to any one of Supplementary notes 1 to 10; and an alert output apparatus for outputting an alert according to the determination result, in a case where the state of density in the space is not appropriate.

(Supplementary Note 13)

An information processing method performed by a computer to:

acquire image data of a predetermined space captured by a camera, generate measurement data by measuring the number and a person-to-person distance of persons included in the image data, set space data about a size of the space, determine whether a state of density of the persons in the space is appropriate or not, based on the measurement data and the space data, and output a result of the determination.

(Supplementary Note 14)

A program for causing a computer to perform an information processing method including:

acquiring image data of a predetermined space captured by a camera, generating measurement data by measuring the number and a person-to-person distance of persons included in the image data, setting space data about a size of the space, determining whether a state of density of the persons in the space is appropriate or not, based on the measurement data and the space data, and outputting a result of the determination.

REFERENCE SIGNS LIST

1 INFORMATION PROCESSING SYSTEM
2 INFORMATION PROCESSING SYSTEM
10 INFORMATION PROCESSING APPARATUS
20 INFORMATION PROCESSING APPARATUS
30 INFORMATION PROCESSING APPARATUS
111 IMAGE DATA ACQUISITION UNIT
112 MEASURING UNIT
113 SPACE DATA SETTING UNIT
114 DETERMINATION UNIT
115 OUTPUT UNIT
116 ESTIMATION UNIT
117 DEGREE-OF-RISK CALCULATION UNIT
118 CO2 DATA ACQUISITION UNIT
119 POSITION DATA ACQUISITION UNIT
120 STORAGE UNIT
200 INFORMATION MANAGEMENT APPARATUS
211 DETERMINATION RESULT ACQUISITION UNIT
212 INFORMATION INPUT UNIT
213 COMMUNICATION UNIT
214 CONTROL UNIT
215 DISPLAY UNIT
220 STORAGE UNIT
300 SPACE
310 CAMERA
320 CONCENTRATION SENSOR
330 POSITION DATA ACQUISITION APPARATUS
340 ALERT OUTPUT APPARATUS
500 COMPUTER
502 BUS
504 PROCESSOR
506 MEMORY
508 STORAGE DEVICE
510 INPUT/OUTPUT INTERFACE
512 NETWORK INTERFACE
900 FACILITY
N1 NETWORK
P1 PERSON
P2 PERSON

The invention claimed is:

1. An information processing apparatus comprising:

at least one memory storing instructions; and at least one processor configured to execute the instructions to:

acquire image data of a predetermined space captured by a camera at a plurality of different times;

acquire CO2 data that is data about concentration of carbon dioxide, from a concentration sensor for measuring the concentration of carbon dioxide in the space to estimate a number of the persons based on the CO2 data;

acquire position data of a mobile terminal carried by each of the persons in the space to estimate person-to-person distance based on the position data;

generate measurement data including the person-to-person distance between persons, the number of the persons and moving speeds of the persons included in the image data;

set space data about a size of the space;

determine whether a state of density of the persons in the space is appropriate or not, based on the measurement data and the space data;

output information about a determination result from the determination; and in a case where the state of density is determined to be not appropriate, prevent output of the determination result indicating that the state of density is appropriate, until after a predetermined period of time after the determination.

2. The information processing apparatus according to claim 1, wherein the at least one processor is further configured to execute the instructions to:

set reference data about the person-to-person distance in the space based on the space data; and perform determination based on the measurement data and the reference data.

3. The information processing apparatus according to claim 2, wherein the at least one processor is further configured to execute the instructions to:

generate, as the measurement data, statistical data about the person-to-person distance; and set the reference data corresponding to the statistical data for the space, based on the space data.

4. The information processing apparatus according to claim 1, wherein the at least one processor is further configured to execute the instructions to:

generate the measurement data including moving speeds of the persons; and perform determination by taking the moving speeds into account.

5. The information processing apparatus according to claim 2, wherein the at least one processor is further configured to execute the instruction to set the reference data based on the measurement data for each of a plurality of different times.

6. The information processing apparatus according to claim 1, wherein the at least one processor is further configured to execute the instructions to:

generate estimated data by estimating the measurement data for a predetermined set time based on the measurement data for each of a plurality of different times before the set time; and perform determination according to the estimated data, based on the estimated data and the space data.

7. The information processing apparatus according to claim 6, wherein the at least one processor is further configured to execute the instruction to estimate a degree of risk when a predetermined person enters the space at the set time, based on the determination result according to the estimated data.

8. An information processing system including:

the information processing apparatus according to claim 1; and an alert output apparatus for outputting an alert according to the determination result, in a case where the state of density in the space is not appropriate.

9. An information processing method performed by a computer, the information processing method comprising:

acquiring image data of a predetermined space captured by a camera at a plurality of different times;

acquiring CO2 data that is data about concentration of carbon dioxide, from a concentration sensor for measuring the concentration of carbon dioxide in the space to estimate a number of the persons based on the CO2 data;

acquiring position data of a mobile terminal carried by each of the persons in the space to estimate person-to-person distance based on the position data;

generating measurement data by measuring the number and the person-to-person distance of persons, the number of the persons and moving speeds of the persons included in the image data;

setting space data about a size of the space;

determining whether a state of density of the persons in the space is appropriate or not, based on the measurement data and the space data;

outputting information about a result of the determination; and in a case where the state of density is determined to be not appropriate, preventing output of the determination result indicating that the state of density is appropriate, until after a predetermined period of time after the determination.

10. A non-transitory computer-readable medium storing a program for causing a computer to perform an information processing method including:

acquiring image data of a predetermined space captured by a camera at a plurality of different times;

acquiring CO2 data that is data about concentration of carbon dioxide, from a concentration sensor for measuring the concentration of carbon dioxide in the space to estimate a number of the persons based on the CO2 data;

acquiring position data of a mobile terminal carried by each of the persons in the space to estimate person-to-person distance based on the position data;

generating measurement data by measuring the number and the person-to-person distance of persons, the number of the persons and moving speeds of the persons included in the image data;

setting space data about a size of the space;

determining whether a state of density of the persons in the space is appropriate or not, based on the measurement data and the space data;

outputting information about a result of the determination; and in a case where the state of density is determined to be not appropriate, preventing output of the determination result indicating that the state of density is appropriate, until after a predetermined period of time after the determination.

* * * * *